(12) United States Patent
Uchino et al.

(10) Patent No.: US 11,643,741 B2
(45) Date of Patent: May 9, 2023

(54) METHOD OF PRODUCING HYDROGEN

(71) Applicant: ASAHI KASEI KABUSHIKI KAISHA, Tokyo (JP)

(72) Inventors: Yousuke Uchino, Tokyo (JP); Norikazu Fujimoto, Tokyo (JP); Jun Ohno, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 113 days.

(21) Appl. No.: 17/289,591

(22) PCT Filed: Oct. 21, 2019

(86) PCT No.: PCT/JP2019/041309
§ 371 (c)(1),
(2) Date: Apr. 28, 2021

(87) PCT Pub. No.: WO2020/095664
PCT Pub. Date: May 14, 2020

(65) Prior Publication Data
US 2022/0106695 A1 Apr. 7, 2022

(30) Foreign Application Priority Data
Nov. 5, 2018 (JP) .............................. JP2018-208062

(51) Int. Cl.
*C25B 15/08* (2006.01)
*C25B 9/73* (2021.01)
(Continued)

(52) U.S. Cl.
CPC .............. *C25B 15/083* (2021.01); *C25B 1/04* (2013.01); *C25B 9/73* (2021.01); *C25B 15/02* (2013.01); *C25B 15/087* (2021.01)

(58) Field of Classification Search
CPC .................................. C25B 1/04; C25B 15/02
See application file for complete search history.

(56) References Cited

U.S. PATENT DOCUMENTS

| 5,484,512 | A | 1/1996 | Sasaki et al. |
| 10,914,014 | B2 * | 2/2021 | Ito .............................. C25B 1/04 |

(Continued)

FOREIGN PATENT DOCUMENTS

| AU | 2013224676 B2 | 12/2015 |
| EP | 3604617 A1 | 2/2020 |

(Continued)

OTHER PUBLICATIONS

Nov. 26, 2021, the Supplementary European Search Report issued by the European Patent Office in the corresponding European Patent Application No. 19882721.4.

(Continued)

*Primary Examiner* — Brian W Cohen
(74) *Attorney, Agent, or Firm* — Kenja IP Law PC

(57) ABSTRACT

A method of producing hydrogen using a water electrolysis system comprising at least an electrolyzer and a purifier for removing oxygen in a hydrogen gas generated in the electrolyzer. The method includes controlling a concentration of oxygen in a hydrogen gas to be introduced to the purifier to be constantly less than 0.5 volume % when the electrolyzer is operated at least under a current density of 0.5 kA/m² or greater; and further controlling Ob/Oa to be less than 10.0, where Oa represents the concentration of oxygen in the hydrogen gas to be introduced to the purifier when the electrolyzer is operated under a current density of 2.0 kA/m², and Ob represents the concentration of oxygen in the hydrogen gas to be introduced to the purifier when the electrolyzer is operated under a current density of 0.2 kA/m².

12 Claims, 4 Drawing Sheets

(51) Int. Cl.
*C25B 1/04* (2021.01)
*C25B 15/02* (2021.01)

(56) References Cited

U.S. PATENT DOCUMENTS

| | | | |
|---|---|---|---|
| 11,408,081 B2* | 8/2022 | Thomassen | C25B 9/77 |
| 2005/0126924 A1 | 6/2005 | Gomez | |
| 2012/0090989 A1* | 4/2012 | Haryu | C25B 9/73 204/237 |
| 2017/0101717 A1* | 4/2017 | Sone | H01M 8/186 |
| 2019/0006695 A1 | 1/2019 | Swiegers et al. | |
| 2019/0271091 A1 | 9/2019 | Taniguchi et al. | |

FOREIGN PATENT DOCUMENTS

| | | |
|---|---|---|
| EP | 3604620 A1 | 2/2020 |
| JP | S58174239 A | 10/1983 |
| JP | S6270203 A | 3/1987 |
| JP | 2735723 B2 | 4/1998 |
| JP | 3604620 B2 | 12/2004 |
| JP | 2012111981 A | 6/2012 |
| WO | 2017100840 A1 | 6/2017 |
| WO | 2018155308 A1 | 8/2018 |
| WO | 2018174281 A1 | 9/2018 |
| WO | 2018182005 A1 | 10/2018 |

OTHER PUBLICATIONS

Jan. 21, 2020, International Search Report issued in the International Patent Application No. PCT/JP2019/041309.
May 11, 2021, International Preliminary Report on Patentability issued in the International Patent Application No. PCT/JP2019/041309.

* cited by examiner

METHOD OF PRODUCING HYDROGEN

TECHNICAL FIELD

The present disclosure relates to a method of producing hydrogen.

BACKGROUND

In recent years, research and developments have been conducted for power storage and transportation technologies which enable electric power to be stored and transported for later usage for the purpose of well balancing supply and demand of electric power and improving the efficiency of power generation. As one such technology, studies have been conducted on conversions of electric power into storable and transportable hydrogen to thereby utilize hydrogen as energy sources or materials.

Hydrogen is widely used industrially in the fields of, for example, petroleum refining, chemical synthesis, and metal refining, and in recent years it can be used in many fields such as in hydrogen stations for fuel cell vehicles (FCVs), smart communities, and hydrogen power plants. Accordingly, there is high expectation for the development of technology to obtain hydrogen.

Methods of producing hydrogen can be broadly classified into those using fossil fuels as raw materials and those through decomposition of water. Methods through decomposition of water, particularly electrolysis of water (water electrolysis), emit no carbon dioxide, and have thus been attracting attention. Methods for electrolysis of water include solid polymer electrolyte water electrolysis, high-temperature steam electrolysis, and alkaline water electrolysis. Of these, alkaline water electrolysis is regarded as one of the most promising because of its industrialization over decades, large-scale availability, and inexpensiveness as compared to other water electrolysis devices.

In alkaline water electrolysis, water is electrolyzed to generate hydrogen on the cathode side and oxygen on the anode side. For preventing mixing of the generated gases (hydrogen and oxygen), membrane is interposed between the cathode side and the anode side. The membrane, however, is in communication with the electrolytic solution through pores in the membrane, and a trace amount of oxygen is thus mixed into hydrogen generated on the cathode side. The oxygen mixed into hydrogen is removed by a deoxygenation means (purifier) on downstream. For example, oxygen is caused to react with hydrogen with an aid of a deoxidizing catalyst or the like described in PTL 1 to convert oxygen into water, followed by dehumidification, to thereby obtain a high-purity hydrogen gas. Methods of producing high-purity hydrogen through a combination with electrolysis of water are disclosed in PLT 2 and PTL 3.

CITATION LIST

Patent Literature

PTL 1: JP S58-174239 A
PTL 2: JP 2735723 B
PTL 3: JP 3604620 B

SUMMARY

Technical Problem

The concentration of oxygen in a generated hydrogen gas, however, deviates depending on the operating conditions of alkaline water electrolysis, and various problems may arise in the event that the concentration of oxygen in the hydrogen gas to be fed to a deoxygenation mechanism such as a purifier increases.

For example, an increase in the concentration of oxygen in the hydrogen gas to be fed to the purifier may cause a local increase in the temperature of a deoxidizing catalyst due to heat generated in a catalytic reaction of the catalyst, which may promote degradation of the catalyst. In addition, water generated by the catalytic reaction of hydrogen and oxygen in the purifier also increases, which creates a humid atmosphere within the purifier. This may promote degradation of the catalyst, and may lead to penetration of water mist in subsequent stages and an increase in the amount of drain water. These may in turn cause fluctuations of the temperature and pressure of the hydrogen gas in the purifier, thereby causing problems, such as difficulty in designing processes in subsequent stages and reduction in the accuracies and failures of meters and other devices which monitor the purifier.

There is thus a need to control the concentration of oxygen in a hydrogen gas to be fed to a purifier in a stable manner for extending the service life of a deoxidizing catalyst and preventing reduction in the accuracies and failures of meters and other devices.

It would thus be helpful to provide a method of producing hydrogen which is capable of controlling the concentration of oxygen in a hydrogen gas to be fed to a purifier in a stable manner.

Solution to Problem

The primary features of the present disclosure are as described below.

(1) A method of producing hydrogen using a water electrolysis system comprising at least an electrolyzer and a purifier for removing oxygen in a hydrogen gas generated in the electrolyzer, the method comprising:
controlling a concentration of oxygen in a hydrogen gas to be introduced to the purifier to be constantly less than 0.5 volume % when the electrolyzer is operated at least under a current density of 0.5 kA/m$^2$ or greater; and
further controlling Ob/Oa to be less than 10.0, where Oa represents the concentration of oxygen in the hydrogen gas to be introduced to the purifier when the electrolyzer is operated under a current density of 2.0 kA/m$^2$, and Ob represents the concentration of oxygen in the hydrogen gas to be introduced to the purifier when the electrolyzer is operated under a current density of 0.2 kA/m$^2$.

(2) The method of producing hydrogen according to (1), wherein the concentration of oxygen in the hydrogen gas to be introduced to the purifier is controlled to be constantly less than 0.5 volume % when the electrolyzer is operated at least under a current density of 0.2 kA/m$^2$ or greater.

(3) The method of producing hydrogen according to (1) or (2), wherein the concentration of oxygen in the hydrogen gas to be introduced to the purifier is controlled to be constantly less than 0.2 volume % when the electrolyzer is operated under a current density of 0.2 kA/m$^2$ or greater.

(4) The method of producing hydrogen according to any one of (1) to (3), wherein the concentration of oxygen in the hydrogen gas to be introduced to the purifier is controlled to be constantly less than 0.5 volume % even when the electrolyzer is operated under a current density of 0.1 kA/m$^2$ or greater.

(5) The method of producing hydrogen according to any one of (1) to (4), wherein the water electrolysis system has a mechanism for controlling the concentration of oxygen in the hydrogen gas to be fed to the purifier.

(6) The method of producing hydrogen according to (5), wherein the mechanism for controlling the concentration of oxygen in the hydrogen gas to be fed to the purifier is a mechanism for controlling a circulation flow rate of an electrolytic solution to the electrolyzer.

(7) The method of producing hydrogen according to (6), wherein the mechanism for controlling the circulation flow rate of the electrolytic solution to the electrolyzer comprises at least one of an inverter disposed to a tubing pump for circulating the electrolytic solution and an automatic control valve disposed to a liquid distribution pipe for distributing the electrolytic solution.

(8) The method of producing hydrogen according to any one of (5) to (7), wherein the mechanism for controlling the concentration of oxygen in the hydrogen gas to be fed to the purifier is a mechanism for feeding a part of the hydrogen gas purified by the purifier.

(9) The method of producing hydrogen according to any one of (5) to (8), wherein the mechanism for controlling the concentration of oxygen in the hydrogen gas to be fed to the purifier is a mechanism for controlling the concentration of oxygen according to the current density in the electrolyzer.

(10) The method of producing hydrogen according to any one of (5) to (9), wherein the mechanism for controlling the concentration of oxygen in the hydrogen gas to be fed to the purifier is a mechanism for controlling the concentration of oxygen according to the concentration of oxygen in the hydrogen gas to be fed to the purifier.

(11) The method of producing hydrogen according to any one of (1) to (10), wherein the electrolyzer is used under an alkaline condition.

(12) The method of producing hydrogen according to any one of (1) to (11), wherein the electrolyzer comprises electrode compartments and a flow path for distributing the electrolytic solution to the electrode compartments, the flow path being partially formed from an insulating material.

Advantageous Effect

According to the present disclosure, a method of producing hydrogen can be provided which is capable of controlling the concentration of oxygen in a hydrogen gas to be fed to a purifier in a stable manner.

DETAILED DESCRIPTION

Hereinafter, an embodiment for embodying the present disclosure (hereinafter referred to merely as "the present embodiment") will be described in detail. The present disclosure is not limited to the following embodiment, but may be performed by modifying within the scope of the subject thereof.

Note that, in the embodiments of the present disclosure, the expression "A (value) to B (value)" means A or more and B or less.

[Method of Producing Hydrogen]

A method of producing hydrogen of the present embodiment is a method of producing hydrogen using a water electrolysis system comprising at least an electrolyzer and a purifier for removing oxygen in a hydrogen gas generated in the electrolyzer. The method includes:

controlling a concentration of oxygen in a hydrogen gas to be introduced to the purifier to be constantly less than 0.5 volume % when the electrolyzer is operated at least under a current density of 0.5 kA/m$^2$ or greater; and further controlling Ob/Oa to be less than 10.0, where Oa represents the concentration of oxygen in the hydrogen gas to be introduced to the purifier when the electrolyzer is operated under a current density of 2.0 kA/m$^2$, and Ob represents the concentration of oxygen in the hydrogen gas to be introduced to the purifier when the electrolyzer is operated under a current density of 0.2 kA/m$^2$.

In the method of producing hydrogen of the present embodiment, the "concentration of oxygen in a hydrogen gas (in volume %)" refers to the volume % of oxygen relative to the sum of the volume of hydrogen and the volume of oxygen in the hydrogen gas ($O_2/(H_2+O_2) \times 100$).

In the method of producing hydrogen of the present embodiment, for example, hydrogen is produced by carrying out alkaline water electrolysis using an alkaline water electrolysis system comprising an electrolyzer and a purifier for removing oxygen in a hydrogen gas generated in the electrolyzer.

Alkaline Water Electrolysis System

Hereinafter, an alkaline water electrolysis system which can be used in the present embodiment will be described briefly with reference to the drawings.

The alkaline water electrolysis system of the present embodiment is not particularly limited as long as the system includes at least an electrolyzer and a purifier for removing oxygen in a hydrogen gas generated in the electrolyzer.

Figure 1:
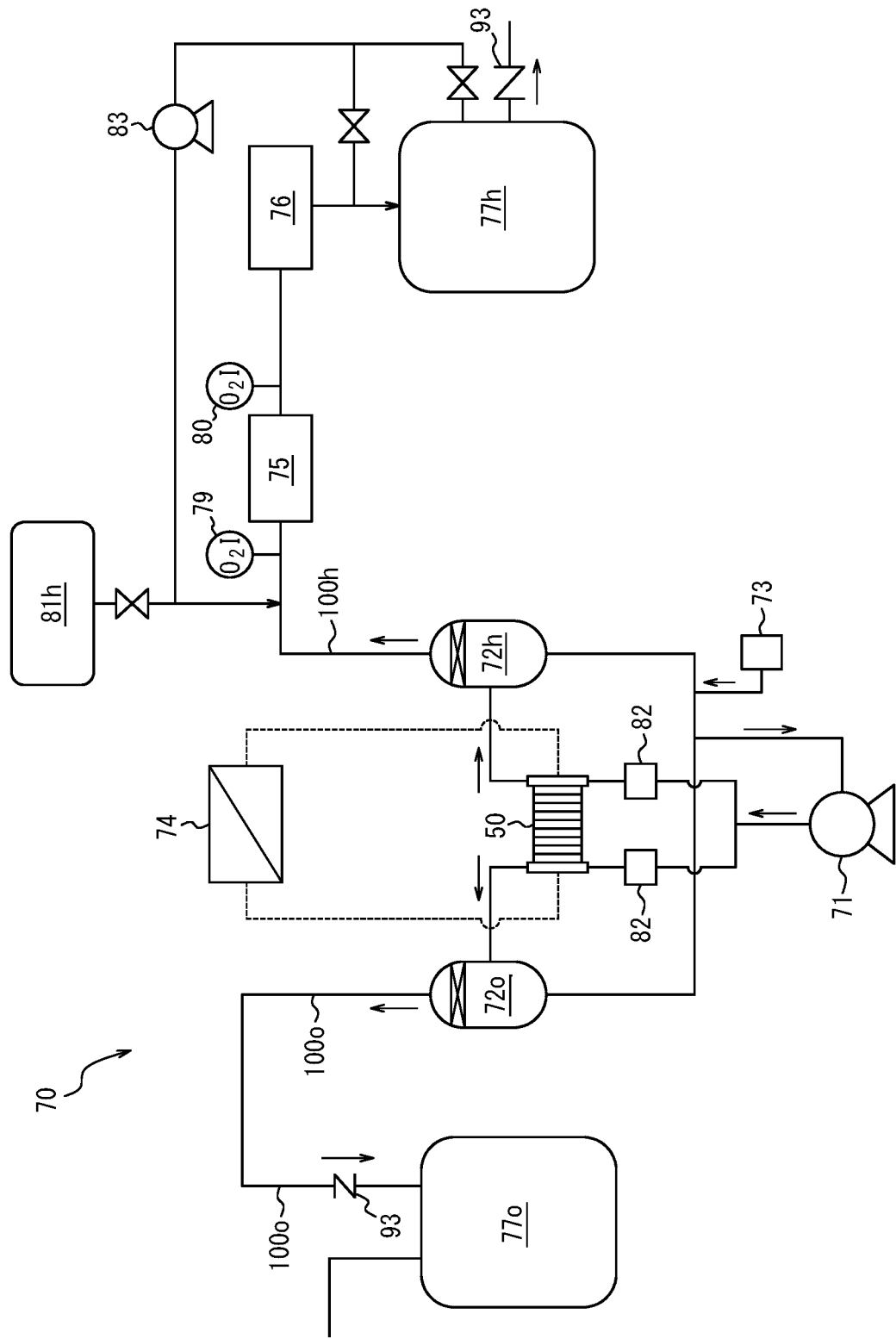
FIG. 1 is a diagram illustrating an overview of an example of an alkaline water electrolysis system of the present embodiment.

An overview of an example of an alkaline water electrolysis system which can be used in the present embodiment is illustrated FIG. 1.

As illustrated in FIG. 1, in the alkaline water electrolysis system 70 of the present embodiment, an electrolyzer 50, a hydrogen separation tank 72h, and a purifier 75 are connected by a hydrogen gas line 100h through which a hydrogen gas generated at a cathode of the electrolyzer 50 passes. The electrolyzer 50, the hydrogen separation tank 72h, and the purifier 75 are preferably, but not particularly limited, connected in series. A serial connection of these components improves the efficiency of separation and purification of the hydrogen gas.

As illustrated in FIG. 1, in the alkaline water electrolysis system 70 of the present embodiment, the hydrogen gas generated in a cathode compartment of the electrolyzer 50 passes through the hydrogen separation tank 72h and the purifier 75 via the hydrogen gas line 100h.

Hereinafter, the electrolyzer 50, the hydrogen separation tank 72h, and the purifier 75 will be described briefly.

Electrolyzer

The electrolyzer 50 of the present embodiment is not particularly limited as long as it has a mechanism capable of carrying out alkaline water electrolysis and separating a hydrogen gas generated in a cathode compartment from an oxygen gas generated in an anode compartment to collect and discharge the gases.

Although the electrolyzer 50 may be either a monopolar type or a bipolar type, a bipolar electrolyzer 50 is industrially preferred. In a bipolar type, a plurality of electrolytic cells each having a combination of an anode, a cathode, a membrane interposed therebetween are arranged in the same orientation and are connected in series having the membranes sandwiched therebetween, and only both ends are connected to a power supply. A bipolar electrolyzer 50 serving as the electrolyzer 50 can reduce power supply from the power source, and enables production of a large amount of hydrogen through alkaline water electrolysis in short time.

Note that the bipolar electrolyzer 50 is regarded to have a configuration in which a plurality of bipolar elements each having a cathode as a component of a single electrolytic cell, an anode as a component of that electrolytic cell arranged adjacent to the cathode in the direction on the cathode terminal side, a partition wall separating the cathode and the anode, and an outer frame bordering the partition, are stacked with membranes sandwiched therebetween.

As illustrated in FIG. 1, the electrolyzer 50 and the hydrogen separation tank 72h are connected by the hydrogen gas line 100h, and a current of a mixed phase of a hydrogen gas generated in the cathode compartment and an electrolytic solution flows out of the electrolyzer 50 into the hydrogen separation tank 72h through the hydrogen gas line 100h.

If necessary, components such as a flow rate control valve (not illustrated) and a flow meter 82 may be provided between the electrolyzer 50 and the hydrogen separation tank 72h.

The electrolyzer 50 is connected to an electrolytic solution supply/discharge plumbing pipes, called a header, shared by a plurality of electrolytic cells. In general, the anode solution distribution pipe is called an anode inlet header, the cathode solution distribution pipe is called a cathode inlet header, the anode solution collection pipe is called an anode outlet header, and the cathode solution collection pipe is called a cathode outlet header. The electrolytic cells are connected to the corresponding electrolytic solution distribution pipes and the corresponding electrolytic solution collection pipes through hoses or the like. Bipolar electrolyzers are classified into an internal header type bipolar electrolyzer and an external header type bipolar electrolyzer depending on the positions where the headers are disposed.

The electrolyzer may be either header type, and the flow paths for distributing the electrolytic solution to the respective electrode compartment are preferably partially formed from an insulating material. Flow paths partially formed from an insulating material can reduce leakage current flows during electrolysis and reduce the concentration of oxygen in hydrogen.

In the bipolar electrolyzer of external header type, the anode inlet header and the cathode inlet header run in parallel to the electrolyzer 50 in a direction perpendicular to the current-carrying surfaces of the electrolytic cells. The anode inlet header and the cathode inlet header are connected to respective electrolytic cells by hoses. For example, these hoses are preferably partially formed from an insulating material.

Although the material of the hoses is not particularly limited, it is necessary to adopt those which have sufficient resistance against corrosive properties of the electrolytic solution to be used, as well as having an insulation property, and can withstand operating conditions such as pressure and temperature, and so on. Specifically, PTFE, ETFE, PFA, polyvinyl chloride, polypropylene, polyethylene, and the like are preferably adopted.

Hydrogen Separation Tank

The hydrogen separation tank 72h of the present embodiment has a mechanism for separating a hydrogen gas generated in the electrolyzer 50 from the electrolytic solution, and includes at least one inlet through which a mixed phase material of the hydrogen gas generated in the cathode compartment in the electrolyzer 50 and the electrolytic solution flows, one hydrogen gas outlet provided at the upper portion of the tank for discharging the hydrogen gas, and one electrolytic solution inlet for discharging the electrolytic solution.

The inlet to the hydrogen separation tank 72h is preferably, but not limited to, located above the liquid level of the electrolytic solution for improving separation of hydrogen.

The hydrogen separation tank 72h may include further components such as a liquid level gauge and a pressure release valve.

The electrolytic solution from which the hydrogen gas has been separated flows out of the tank through the electrolytic solution outlet located at the bottom of the tank and flows into the electrolyzer 50, to thereby form a circulation path.

As illustrated in FIG. 1, the hydrogen separation tank 72h and the purifier 75 are connected by the hydrogen gas line 100h, and hydrogen gas separated from the electrolytic solution flows out of the hydrogen gas outlet disposed at the upper part of the tank and flows into the purifier 75 through the hydrogen gas line 100h.

If necessary, further components, such as a gas density meter (e.g., oxygen-in-hydrogen-gas density meter $O_2I$) 79, a mist separator, a heat exchanger, various control valves, and a hydrogen gas return line for feeding a part of the hydrogen gas or hydrogen, may be provided between the hydrogen separation tank 72h and the purifier 75.

Purifier

The purifier 75 of the present embodiment has a purification mechanism for removing oxygen in a hydrogen gas, and includes at least one hydrogen gas inlet through which a hydrogen gas containing oxygen flows, and one hydrogen gas outlet through which deoxygenated hydrogen flows out.

Examples of the purification mechanism for removing oxygen in the hydrogen gas include a mechanism for causing oxygen to react with hydrogen with an aid of a deoxidizing catalyst for converting oxygen into water. For increasing the conversion efficiency, the temperature of the hydrogen gas is preferably maintained within a suitable range in advance. In particular, the hydrogen gas can be preheated to a suitable temperature ranging from 100° C. to 300° C. by a heat exchanger or the like. Deoxygenated gas is cooled by a heat exchanger if necessary and condensed moisture is then separated, followed by dehumidification by a dehumidifier to produce high-purity hydrogen.

If necessary, the purifier may also be provided with a controller which enables manual or automatic controls of the purification mechanism. The controller may be controlled by signals from a separate component of the alkaline water electrolysis system.

If necessary, further components, such as means for detecting the oxygen density (e.g., oxygen density meter $O_2I$) 80, meters 76 which monitor the purifier 75 (e.g., a temperature detector and a pressure detector), a heat exchanger, a mist separator, a dehumidifier, a hydrogen storage tank 77h for storing purified hydrogen, a compressor, a hydrogen gas return line for returning a part of the hydrogen gas to the upstream side of the purifier 75, and various control valves, may be provided downstream to the hydrogen gas outlet of the purifier 75.

As illustrated in FIG. 1, the alkaline water electrolysis system 70 of the present embodiment may include further components other than the components described above, such as a tubing pump 71 for circulating the electrolytic solution, an oxygen gas line 100o through which the oxygen gas generated at the anode of the electrolyzer 50 passes, an oxygen separation tank 72o for separating the electrolytic solution and oxygen, an oxygen storage tank 77o for storing oxygen, a water replenisher 73 for replenishing water consumed in electrolysis, a rectifier 74 for supplying electric power to the electrodes in the electrolyzer 50, flow meters 82, and non-return valves 93 for preventing reverse flows of respective gases, for example. If necessary, further component, such as a gas density meter, a pressure gauge PI, various control valves, various control devices, and a heat exchanger, may also be provided.

Although the components of the alkaline water electrolysis system 70 as described above can be used to manufacture the alkaline water electrolysis system 70 having the configuration as illustrated in FIG. 1 in the present embodiment, for example, the present embodiment is not limited to this configuration.

Control on Concentration of Oxygen in Hydrogen Gas

Next, controls on the concentration of oxygen in the hydrogen gas on the downstream side of the electrolyzer 50 in the present embodiment will be specifically described.

Figure 2:
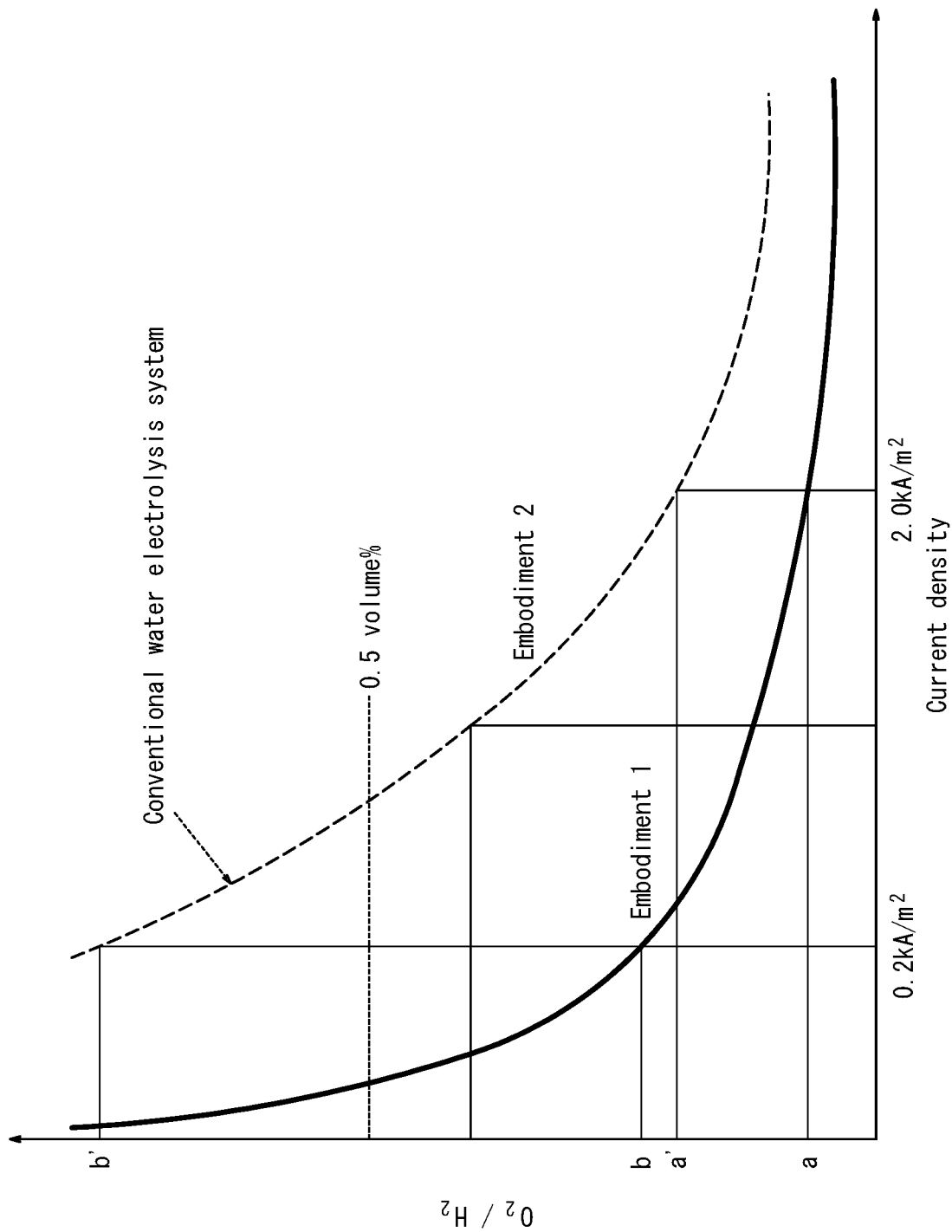
FIG. 2 is a diagram illustrating an example of a method to operate the water electrolysis system in a method of producing hydrogen of the present embodiment, where in FIG. 2, the horizontal axis represents the current density and the vertical axis represents the concentration of oxygen in a hydrogen gas, and the curve of the water electrolysis system of the present embodiment is indicated by the solid line whereas the curve of a conventional water electrolysis system is indicated by the broken line.

FIG. 2 is a diagram illustrating an example of a method to operate the water electrolysis system in the method of producing hydrogen of the present embodiment. In FIG. 2, the horizontal axis represents the current density and the vertical axis represents the concentration of oxygen in a hydrogen gas, and the curve of the water electrolysis system of the present embodiment is indicated by the solid line whereas the curve of a conventional water electrolysis system is indicated by the broken line.

In the method of producing hydrogen of the present embodiment, the water electrolysis system is controlled so that the concentration of oxygen in a hydrogen gas to be introduced to the purifier 75 is constantly less than 0.5 volume % when the electrolyzer 50 is operated at least under a current density of 0.5 kA/m$^2$ or greater; and the water electrolysis system is further controlled so that the ratio Ob/Oa is less than 10.0, where Oa represents the concentration of oxygen in the hydrogen gas to be introduced to the purifier 75 when the electrolyzer 50 is operated under a current density of 2.0 kA/m$^2$ (hereinafter also referred to as the "oxygen density Oa") and Ob represents the concentration of oxygen in the hydrogen gas to be introduced to the purifier 75 when the electrolyzer 50 is operated under a current density of 0.2 kA/m$^2$ (hereinafter also referred to as the "oxygen density Ob").

By controlling the concentration of oxygen in the hydrogen gas to be introduced to the purifier 75 so as to be constantly be less than 0.5 volume % when the electrolyzer 50 is operated at least under a current density of 0.5 kA/m$^2$ or greater, a stable control on the concentration of oxygen in the hydrogen gas to be fed to the purifier 75 can be achieved, degradation of the deoxidizing catalyst, reduction in the purification efficiency, reduction in the accuracies and failures of the meters 76 which monitor the purifier 75 can be prevented, and the design of the processes in subsequent stages can be made easier.

Although the above-listed effects are advantageous in fixed power supply operations, these become more advantageous in variation power supply operations in which power is supplied from variable power sources such as solar power and wind power sources. This is because, in variable power source operations, the operating conditions of the electrolyzer 50 frequently vary due to fluctuations of supplied power, resulting in frequent deviation in the concentration of oxygen in a hydrogen gas to be fed to the purifier 75.

Hydrogen production through electrolysis is operated typically under an operating condition with a current density of 2.0 kA/m$^2$ or greater, and is preferably operated under a current density of 4.0 kA/m$^2$ to 20.0 kA/m$^2$ and more preferably under a current density of 6.0 kA/m$^2$ to 15.0 kA/m$^2$. It can be regarded that a higher current density can give a higher utilization ratio of the facility because the amount of hydrogen produced increases in proportion to the current density. On the contrary, the efficiency of electrolysis decreases with an increase in the current density, and each electrolyzer 50 has thus a preferred range of the current density.

Nevertheless, the electrolyzer 50 may be operated under an operating condition of a current density of 2.0 kA/m$^2$ or smaller under circumstances, such as in case of power supply drops, specifically, intermittent or periodic power drops during an operation relying on a variable power source, failures of components of the alkaline water electrolysis system 70, and the start-up or shut-down operations during an operating cycle relying on a stable power supply. In a typical electrolysis of water, as indicated by the broken line in FIG. 2, the concentration of oxygen in hydrogen increases as the current density decreases, and may reach 0.5 volume % or more in the current density region of 2.0 kA/m$^2$ or smaller. Such an increase in the concentration of oxygen in hydrogen arises because the hydrogen production amount decreases with a decrease in the current density whereas the amount of oxygen generated remains unchanged due to the effect of leakage current and the influence of dissolution of oxygen into the electrolytic solution.

On the contrary, in the present embodiment, as indicated by the solid line in FIG. 2, the concentration of oxygen in the hydrogen gas to be introduced to the purifier 75 is controlled to be constantly less than 0.5 volume % when the electrolyzer 50 is operated at least under a current density of 0.5 kA/m$^2$ or greater. Such a control on the concentration of oxygen in hydrogen to be less than 0.5 volume % can maintain the load on the purifier 75 below a certain level and can prevent reduction in the accuracies and failures of the meters 76 which monitor the purifier 75.

Further, in the present embodiment, the ratio Ob/Oa is controlled to be less than 10.0, where Oa represents the concentration of oxygen in the hydrogen gas when the electrolyzer 50 is operated under a current density of 2.0 kA/m$^2$, and Ob represents the concentration of oxygen in the hydrogen gas when the electrolyzer 50 is operated under a current density of 0.2 kA/m². Such a control can prevent degradation of the deoxidizing catalyst even in an operation during which the current density frequently fluctuates within a low density region of 2.0 kA/m² or smaller, and can make the design of the processes in subsequent stages easier. For the same reason, Ob/Oa is preferably controlled to be less than 8.0 and is more preferably controlled to be less than less than 5.0.

In the present embodiment, the concentration of oxygen in the hydrogen gas to be introduced to the purifier 75 is preferably controlled to be constantly less than 0.2 volume % and is more preferably controlled to be constantly less than 0.1 volume % when the electrolyzer 50 is operated at least under a current density of 0.5 kA/m² or greater.

In the present embodiment, the concentration of oxygen in the hydrogen gas to be introduced to the purifier 75 is preferably controlled to be constantly less than 0.5 volume %, more preferably controlled to be constantly less than 0.2 volume %, and is even more preferably controlled to be constantly less than 0.1 volume % when the electrolyzer 50 is operated under a current density of 0.2 kA/m² or greater.

When the concentration of oxygen in the hydrogen gas to be fed to the purifier 75 is within any of the above ranges, the purification efficiency can be improved and the service life of the meters 76 which monitor the purifier 75 can be extended.

In addition, in the present embodiment, the concentration of oxygen in the hydrogen gas to be introduced to the purifier 75 is more preferably controlled to be constantly less than 0.5 volume %, and is even more preferably within a range of less than 0.2 volume % when the electrolyzer 50 is operated under a current density of 0.1 kA/m² or greater.

When the concentration of oxygen in the hydrogen gas to be fed to the purifier 75 is within any of the above ranges, the purification efficiency can be improved and the service life of the meters 76 which monitor the purifier 75 can be extended.

The present embodiment may have, but is not limited to, an aspect where the concentration of oxygen in the hydrogen gas upon an operation under a current density of 0.1 kA/m², the concentration of oxygen in the hydrogen gas upon an operation under a current density of 0.2 kA/m², the concentration of oxygen in the hydrogen gas upon an operation under a current density of 0.5 kA/m², and the concentration of oxygen in the hydrogen gas upon an operation under a current density of 2.0 kA/m² gradually decrease in this order may be used, for example. In this case, the concentration of oxygen in the hydrogen gas upon an operation under a current density of 0.1 kA/m² may be maximized in the range of the current density of 0.1 kA/m² to 2.0 kA/m².

Further, the present embodiment may have, but is not limited to, an aspect where the concentration of oxygen in the hydrogen gas upon an operation under a current density of 0.5 kA/m² is greater than the concentration of oxygen in the hydrogen gas upon an operation under a current density of 2.0 kA/m², the concentration of oxygen in the hydrogen gas upon an operation under a current density of 0.2 kA/m², and the concentration of oxygen in the hydrogen gas upon an operation under a current density of 0.1 kA/m², for example. In this case, an aspect where the concentration of oxygen in the hydrogen gas upon an operation under a current density of 0.1 kA/m², the concentration of oxygen in the hydrogen gas upon an operation under a current density of 0.2 kA/m², and the concentration of oxygen in the hydrogen gas upon an operation under a current density of 0.5 kA/m² may gradually increase in this order, and the concentration of oxygen in the hydrogen gas upon an operation under a current density of 0.5 kA/m² may be maximized in the range of the current density of 0.1 kA/m² to 0.5 kA/m².

A determination as to whether the concentration of oxygen is controlled within any of the above ranges can be made by specifically monitoring the concentration of oxygen in the hydrogen gas to be fed to the purifier 75. An example of the method of the monitoring includes monitoring the concentration of oxygen in the hydrogen gas to be fed to the purifier 75 using an oxygen density detection means capable of measuring the concentration of oxygen in the hydrogen gas.

The monitoring of the concentration of oxygen may be continuous or intermittent. For example, the intermittent monitoring may be made by monitoring the concentration of oxygen only when the concentration of oxygen is predicted to be 0.5 volume % due to a low-density current operation or a change in any other operating condition.

Here, in the present embodiment, the water electrolysis system preferably has a mechanism for controlling the concentration of oxygen in the hydrogen gas to be fed to the purifier 75.

In a first aspect, the mechanism for controlling the concentration of oxygen in the hydrogen gas to be fed to the purifier 75 is preferably a mechanism for controlling the circulation flow rate of the electrolytic solution to the electrolyzer 50.

This aspect is intended to suppress an increase in the concentration of oxygen by decreasing the circulation flow rate when the concentration of oxygen in the hydrogen gas to be fed to the purifier 75 increases.

Particularly, in the first aspect, the mechanism for controlling the circulation flow rate of the electrolytic solution to the electrolyzer 50 preferably includes at least one of an inverter disposed to the tubing pump 71 for circulating the electrolytic solution and an automatic control valve disposed to a liquid distribution pipe for distributing the electrolytic solution.

In a second aspect, the mechanism for controlling the concentration of oxygen in the hydrogen gas to be fed to the purifier 75 is preferably a mechanism for feeding a part of hydrogen gas purified by the purifier 75.

This aspect is intended to reduce the concentration of oxygen by feeding hydrogen upstream to the purifier 75 as a method to directly control the concentration of oxygen.

The hydrogen fed upstream to the purifier 75 is preferably a part of the hydrogen gas purified by the purifier 75, but this is not limitative and the hydrogen may be provided from a separate source such as a hydrogen feed tank 81*h* or the like, for example.

Further, the mechanism for controlling the concentration of oxygen in the hydrogen gas to be fed to the purifier 75 is preferably a mechanism for controlling the concentration of oxygen according to the current density in the electrolyzer 50.

Here, for example, in the event that a decrease in the current density in the electrolyzer 50 has detected, the concentration of oxygen is controlled through a control on the circulation flow rate of the electrolytic solution to the electrolyzer 50 or by feeding a part of the hydrogen gas purified by the purifier 75 as described above.

For example, in the event that the current density in the electrolyzer 50 has dropped to a reference value or below, the control on the oxygen density may be initiated. The reference value may be 3.0 kA/m², and is preferably 2.0 kA/m² and more preferably 1.0 kA/m².

Further, a linear control according to the current density in the electrolyzer 50 may also be possible.

Further, the mechanism for controlling the concentration of oxygen in the hydrogen gas to be fed to the purifier 75 is preferably a mechanism for controlling the concentration of oxygen according to the concentration of oxygen in the hydrogen gas to be fed to the purifier 75.

Here, for example, in the event that an increase in the concentration of oxygen in the hydrogen gas to be fed to the purifier 75 has detected, the concentration of oxygen is controlled through a control on the circulation flow rate of the electrolytic solution to the electrolyzer 50 or feeding a part of the hydrogen gas purified by the purifier 75 as described above.

For example, in the event that the concentration of oxygen in the hydrogen gas to be fed to the purifier 75 has reached a reference value or greater, the above control on the concentration of oxygen may be initiated. The reference value may be 0.5 volume %, and is preferably 0.25 volume % and more preferably 0.15 volume %.

Further, a linear control according to the concentration of oxygen in the hydrogen gas may also be possible.

Figure 3:
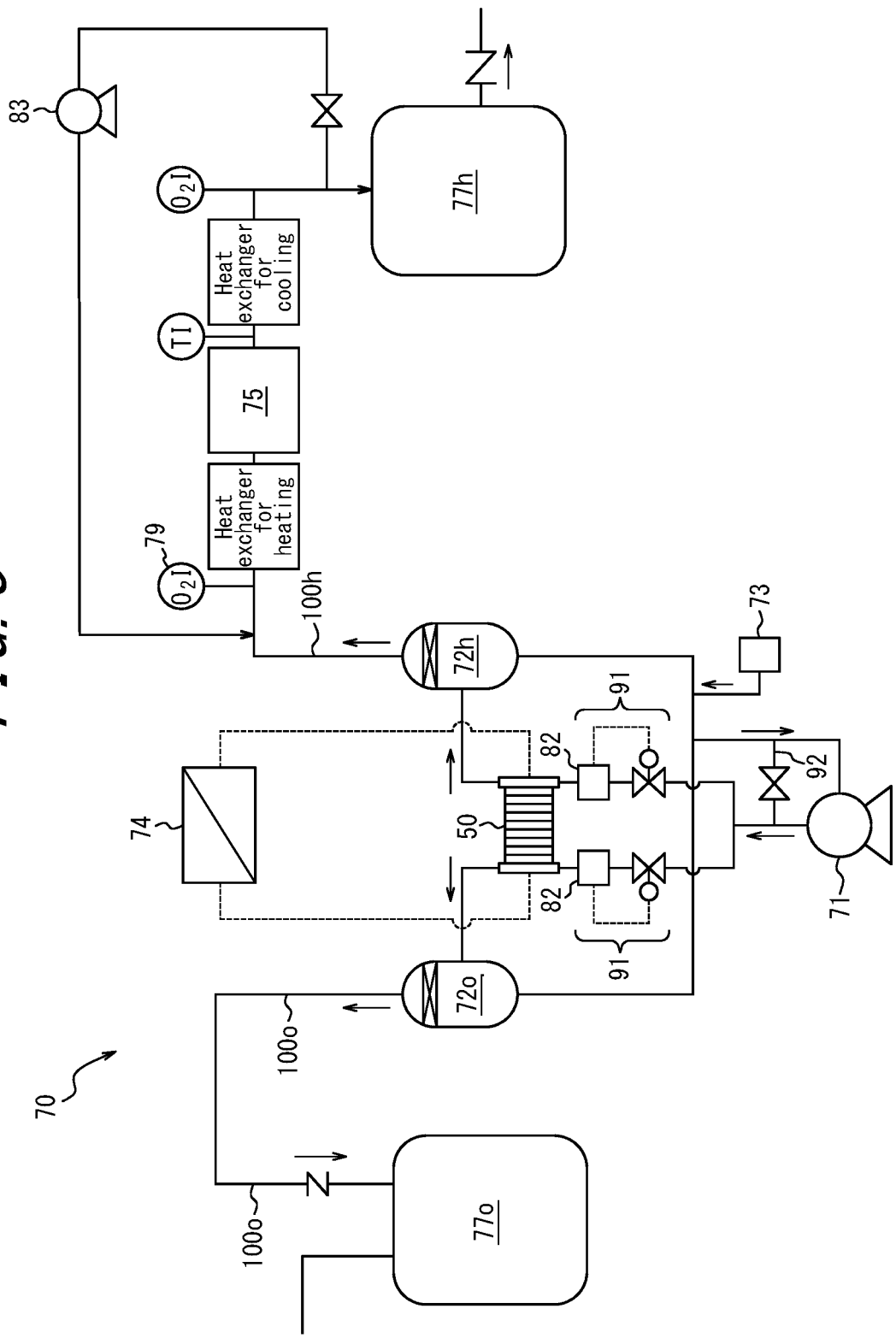
FIG. 3 is a diagram illustrating an overview of another example of the alkaline water electrolysis system of the present embodiment.

FIG. 3 illustrates an overview of another example of the alkaline water electrolysis system 70 of the present embodiment.

Hereinafter, the same elements as those in the alkaline water electrolysis system 70 of the example of the present disclosure illustrated in FIG. 1 are denoted by the like reference symbols, and description thereof will be omitted.

In particular, in another example of the alkaline water electrolysis system 70 illustrated in FIG. 3, a flow rate control valve 91 is provided to the bipolar electrolyzer 50 for enabling controls on the circulation flow rate of the electrolytic solution. Additionally, a bypass line 92 which can function as a bypass path for the tubing pump 71 is also provided in this system for preventing overloads on the tubing pump 71.

Figure 4:
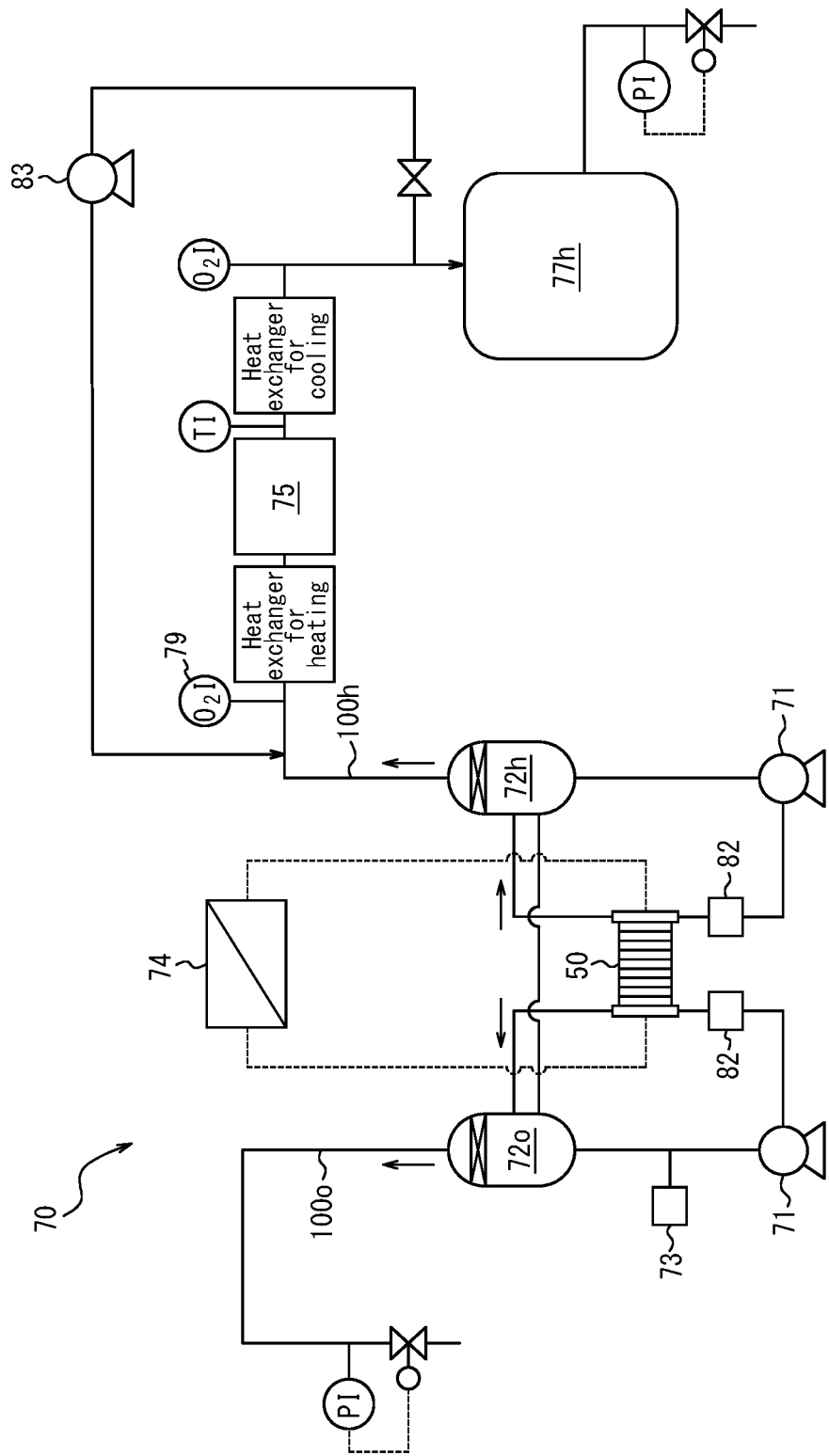
FIG. 4 is a diagram illustrating an overview of yet another example of the alkaline water electrolysis system of the present embodiment.

FIG. 4 illustrates an overview of yet another example of the alkaline water electrolysis system 70 of the present embodiment.

Hereinafter, the same elements as those in the alkaline water electrolysis system 70 of the example of the present disclosure illustrated in FIG. 1 are denoted by the like reference symbols, and description thereof will be omitted.

In particular, in the alkaline water electrolysis system 70 of yet another example illustrated in FIG. 4, the oxygen separation tank 72o and the hydrogen separation tank 72h are in communication with each other through a pressure equalizing pipe so that the differential pressure is prevented from being fluctuated when an output is varied.

While controls on the concentration of oxygen in the hydrogen gas on the downstream side of the electrolyzer 50 have been described using the examples with reference to the drawings, the present embodiment is not limited to the examples described above.

The electrolyzer 50 can be used under a pressurized or normal pressure condition. The electrolyzer 50 can also be used under an alkaline condition.

Conditions for Alkaline Water Electrolysis

Hereinafter, conditions for carrying out alkaline water electrolysis using the alkaline water electrolysis system 70 in the present embodiment will be specifically described.

The power supply for supplying power to the electrolyzer 50 upon carrying out alkaline water electrolysis is not particularly limited, and a stable power supply, a variable power supply, or the like may be used.

A stable power supply is a power supply which relies on a non-renewable or renewable power generated, and whose output is stabilized. An example is grid power. Examples of non-renewable energy power generation which can be used for a stable power source include thermal power generation and nuclear power generation, for example. Examples of renewable energy power generation which can be used for a stable power source include hydroelectric power generation, geothermal power generation, and biomass power generation, for example.

A variable power supply is a power supply whose output fluctuates in increments of several seconds to several minutes derived from a renewable energy power generation. Examples of renewable energy generation which can be used for a variable power source are not particularly limited, and include solar power generation and wind power generation, for example.

In the method of producing hydrogen of the present embodiment, the above-described effects become remarkable when a variable power source derived from solar power generation or wind power generation or the like is used.

The electrolytic solution used for alkaline water electrolysis may be an alkaline water solution containing an alkali salt dissolved therein, and examples include a water solution of NaOH and a water solution of KOH. The concentration of the alkali salt in the electrolytic solution is not particularly limited, but is preferably 20% by mass to 50% by mass and more preferably 25% by mass to 40% by mass. Among these, a 25-mass % to 35-mass % water solution of KOH is particularly preferred from the viewpoint of the ionic conductivity, the kinematic viscosity, and the freezing behavior at cold temperatures.

The temperature of the electrolytic solution in the electrolyzer 50 is not particularly limited, but is preferably from 60° C. to 130° C., more preferably from 80° C. to 120° C., and even more preferably from 90° C. to 110° C.

When the electrolytic solution in the electrolyzer 50 is within any of the above temperature ranges, thermal degradations of the members of the electrolyzer 50 such as gaskets and membranes can be effectively prevented while maintaining a high efficiency of electrolysis.

The current density applied to the electrolyzer 50 is not particularly limited, but the current density is preferably 0.1 kA/m$^2$ to 20 kA/m$^2$, more preferably 2 kA/m$^2$ to 20 kA/m$^2$, and even more preferably 6 kA/m$^2$ to 15 kA/m$^2$.

In particular, when a variable power supply is used, it is preferable to set the upper limit of the current density within any of the above ranges.

The pressure inside the electrolyzer 50 is not particularly limited, but is preferably 3 kPa to 3000 kPa and more preferably 3 kPa to 1000 kPa.

The water replenished by the water replenisher 73 may be general tap water. Nevertheless, when a long-term operation is taken into consideration, ion-exchanged water, RO water, ultrapure water, or the like is preferably used.

The method of producing hydrogen and the alkaline water electrolysis system of the present embodiment have been described above with reference to the accompanying drawings. However, the method of producing hydrogen and the alkaline water electrolysis system of the present embodiment are not limited to the above-described examples, and the embodiment set forth above may be modified as appropriate.

Further, various conditions in each aspect of the present embodiment can be adopted alone or in combination as appropriate.

EXAMPLES

The following describes the present disclosure in more detail through examples. However, the present disclosure is not in any way limited by the following examples.

An alkaline water electrolysis system was fabricated as follows.

Bipolar Element

Each bipolar element was produced as follows.

Partition Wall and Outer Frame

As a bipolar element, one having a partition wall partitioning an anode and a cathode and an outer frame surrounding the partition wall was used. Those members in contact with the electrolytic solution, such as the partition wall and the frame of the bipolar element, were all made of nickel.

Electrodes and Membrane

As the anode, a nickel-expanded metal substrate that had been blasted in advance was used, and granulated products of nickel oxide were sprayed onto both surfaces of the conductive substrate by a plasma spraying method to produce the anode.

Cathode

A platinum-carrying plain weave mesh substrate produced from woven fine wires of nickel having a diameter of 0.15 mm with a mesh count of 40 mesh was used as the conductive substrate.

Membrane

A porous film made of polysulfone containing zirconium oxide particles was used as the membrane. The membrane had a thickness of 0.5 mm, and an average pore size of water permeable pores of 0.3 mm.

The both electrodes were each cut into a size of 50 cm square (50 cm in transverse length by 50 cm in longitudinal length). Further, the membrane was cut into a size of 52.5 cm square (52.5 cm in transverse length by 52.5 cm in longitudinal length).

Zero Gap Structure

The bipolar elements were stacked having gaskets holding membranes interposed therebetween to assemble a bipolar electrolyzer so that the anode and the cathode were brought into contact by pressing from the both sides of the membrane to form a zero-gap structure.

Only the anode was disposed on the anode side whereas a cathode composed of a combination of "cathode—conductive elastic body—current collector" was disposed on the cathode side. The anode and the cathode as described above were used. The conductive elastic body was secured to the current collector by spot welding.

Bipolar Electrolyzer

A bipolar electrolyzer was produced from bipolar elements in the following procedure.

A bipolar electrolyzer was assembled as follows. Nine bipolar elements were prepared. A fast head, an insulating plate, an anode terminal unit were arranged one one end, nine sets of an anode side gasket portion, a membrane, a cathode side gasket portion, and a bipolar element arranged in this order, were then arranged. An anode side gasket portion, a membrane, and a cathode side gasket portion were then arranged. A cathode terminal unit, an insulating plate, and a loose head were arranged on the other end, and the stack was then tightened by applying a pressure from both of the fast head side and the loose head side.

This electrolyzer had a series connection structure composed of 10 pairs of a cathode compartment and an anode compartment.

Each bipolar element was prepared by attaching a cathode to the cathode surface of a bipolar frame, and attaching an anode to the anode surface of the bipolar frame. The cathode terminal element was prepared by attaching a cathode to a cathode terminal frame. The anode terminal element was prepared by attaching an anode to an anode terminal frame.

The electrolysis device for alkaline water electrolysis as illustrated in FIG. 1 was prepared using components that were gegerally used in the relevant technical field for the feed pump, gas-liquid separation tanks, water replenisher, and so forth. An inverter was disposed to a tubing pump so that the circulation flow rate could be controlled according to the current density. In addition, a flow rate control valve was disposed to the subsequent stage of the tubing pump so that the flow rate could be controlled according to the current density.

Hydrogen separated in the hydrogen separation tank was discharged toward the purifier. An oxygen-in-hydrogen-gas density meter ($O_2I$), a pressure gauge, a thermometer, and a pressure control valve were provided en route to the purifier.

The oxygen-in-hydrogen-gas density meter ($O_2I$) used was Model SD-1DOX manufactured by RIKEN KEIKI Co., Ltd. Gas of interest was pumped by a suction pump (not illustrated) toward the sensor portion of the density meter for an analysis of the gas. The oxygen density meter was connected in series between the gas-liquid separation tank and the purifier.

The purifier used contained $Al_2O_3$ supporting 0.5-mass % Pd as a deoxidizing catalyst, which was accommodated in a housing so that L/D was 2. A heat exchanger was disposed at the previous stage of the purifier for preheating the hydrogen gas to 150° C.

An oxygen density meter and a gas temperature detector were disposed at the outlet of the purifier.

An alkaline water electrolysis method using the electrolysis device for alkaline water electrolysis was carried out under the following conditions.

A 30% KOH water solution was used as the electrolytic solution.

A circulation through the cathode compartment, the hydrogen separation tank (cathode gas-liquid separation tank), and the cathode compartment, and a circulation through the anode compartment, the oxygen separation tank (anode gas-liquid separation tank), and the anode compartment were established by the tubing pump 71.

The gas-liquid separation tanks used had a height of 1,400 mm and a volume of 1 $m^3$.

The amount of liquid in each gas-liquid separation tank was about 50% of the design volume.

Electrolysis was carried out by feeding the following current density from the rectifier to each electrode area (0.25 $m_2$) of the bipolar electrolyzer.

Specifically, 4.0 $kA/m^2$ for 24 hours, 2.0 $kA/m^2$ for 1 hour, 4.0 $kA/m^2$ for 1 hour, 0.5 $kA/m^2$ for 1 hour, 4.0 $kA/m^2$ for 1 hour, 0.2 $kA/m^2$ for 1 hour, 4.0 $kA/m^2$ for 1 hour, and 0.1 $kA/m^2$ for 1 hour, totaling 31 hours.

The results of oxygen densities in hydrogen fed to the purifier of 2.0 $kA/m^2$ or smaller after 45 minutes after each change in the current density are summarized in Table 1. The maximum oxygen densities in hydrogen at the outlet of the purifier, and the maximum hydrogen gas temperatures at the outlet of the purifier are also summarized in Table 1.

Example 1

The configuration of an electrolyzer illustrated in FIG. 3 was used.

The header structure adopted in the bipolar electrolyzer was an external header type.

A PFA hose (having an inner diameter ϕ of 8 mm and a length of 0.55 m) was used for distributing the liquid from the inlet header pipe (having an inner diameter ϕ of 40 mm) to each cell. A PFA hose (having an inner diameter ϕ of 16 mm and a length of 0.35 m) was used for distributing the liquid from each cell to the outlet header tube (having an inner diameter φ of 40 mm).

The frequency of the inverter was set so that the circulation flow rate of the electrolytic solution was 630 L/hr (100% output) under a current density of 2.0 kA/m², or was 63 L/hr (10% output) under a current density of 0.1 kA/m² to thereby provide a linear control on the circulation flow rate according to the current density. An operation was carried out while the flow rate control valve was fully opened.

Example 2

Electrolysis was carried out in the same manner as in Example 1 using the same electrolyzer as in Example 1 except that the method to control the circulation flow rate of the electrolytic solution was changed to the following control.

The circulation flow rate of the electrolytic solution was controlled by the flow rate control valve to 630 L/hr under a current density of 1.0 kA/m² or greater, or to 315 L/hr under a current density of less than 1.0 kA/m² to carry out an operation.

Example 3

The configuration of an electrolyzer illustrated in FIG. 3 was used.

The header structure adopted in the bipolar electrolyzer was an internal header type.

The circulation flow rate of the electrolytic solution was set constantly to 250 L/hr. A part of the purified hydrogen gas was fed according to the concentration of oxygen in the hydrogen gas to be fed to the purifier to carry out an operation. Specifically, the frequency of the inverter of the hydrogen feed pump was adjusted so that the feed rate of hydrogen was 4000 NL/hr (100% output) when the concentration of oxygen in hydrogen was 5 volume %, or was 160 NL/hr (4% output) when the concentration of oxygen in hydrogen was 0.2 volume %, to provide a linear control on the feed rate of hydrogen according to the concentration of oxygen in the hydrogen gas to be fed to the purifier.

Example 4

Electrolysis was carried out in the same manner as in Example 3 except that the feed rate of hydrogen was set constantly to 1000 NL/hr in the configuration of Example 3 to carry out an operation.

Example 5

The configuration of an electrolyzer illustrated in FIG. 4 was used.

The header structure adopted in the bipolar electrolyzer was an internal header type.

Two circulation lines for the electrolytic solution, namely, a circulation for the cathode compartment and a circulation for anode compartment, were established by using two pumps.

Respective pressure control valves were disposed at the outlets of oxygen gas and hydrogen gas to maintain the pressures to 1.5 MPa.

The circulation flow rate of the electrolytic solution was set constantly to 250 L/hr.

A part of the purified hydrogen gas was fed constantly at a feed rate of 800 NL/hr to carry out an operation.

Comparative Example 1

Electrolysis was carried out in the same manner as in Example 5 except that an operation was carried out without feeding a part of purified hydrogen gas in the configuration of Example 5.

TABLE 1

| | | FIG. | O2/H2 upon operation under current density of ≥0.5 kA/m2 | O2/H2 upon operation under current density of ≥0.2 kA/m2 | O2/H2 upon operation under current density of ≥0.1 kA/m2 | Current density of 0.1 kA/m² | Oxygen density in hydrogen (by volume) Current density of 0.2 kA/m² (Ob) | Current density of 0.5 kA/m² | Current density of 2.0 kA/m² (Oa) | Ob/Oa | Mechanism for control on oxygen density | Basis for determining control | Maximum oxygen density in hydrogen at outlet of purifier (vol %) | Maximum temperature of hydrogen gas at outlet of purifier (° C.) |
|---|---|---|---|---|---|---|---|---|---|---|---|---|---|---|
| Example 1 | Electrolyzer 1 | FIG. 3 | Constantly less than 0.044 vol % | Constantly less than 0.08 vol % | Constantly less than 0.16 vol % | 0.150 | 0.079 | 0.043 | 0.017 | 4.8 | Electrolytic solution circulation flow rate control mechanism 1 | Current density in electrolyzer | Less than 0.01 | 180 |
| Example 2 | Electrolyzer 1 | FIG. 3 | Constantly less than 0.051 vol % | Constantly less than 0.11 vol % | Constantly less than 0.22 vol % | 0.216 | 0.109 | 0.050 | 0.017 | 6.6 | Electrolytic solution circulation flow rate control mechanism 2 | Current density in electrolyzer | Less than 0.01 | 183 |

TABLE 1-continued

| | | FIG. | O2/H2 upon operation under current density of ≥0.5 kA/m2 | O2/H2 upon operation under current density of ≥0.2 kA/m2 | O2/H2 upon operation under current density of ≥0.1 kA/m2 | Oxygen density in hydrogen (by volume) | | | | Ob/Oa | Mechanism for control on oxygen density | Basis for determining control | Maximum oxygen density in hydrogen at outlet of purifier (vol %) | Maximum temperature of hydrogen gas at outlet of purifier (° C.) |
| | | | | | | Current density of 0.1 kA/m² | Current density of 0.2 kA/m² (Ob) | Current density of 0.5 kA/m² | Current density of 2.0 kA/m² (Oa) | | | | | |
|---|---|---|---|---|---|---|---|---|---|---|---|---|---|---|
| Example 3 | Electrolyzer 2 | FIG. 3 | Constantly less than 0.38 vol % | Constantly less than 0.38 vol % | Constantly less than 0.38 vol % | 0.127 | 0.234 | 0.378 | 0.236 | 1.0 | Part of purified hydrogen gas feeding mechanism 1 | Oxygen density in hydrogen supplied to purifier | Less than 0.01 | 188 |
| Example 4 | Electrolyzer 2 | FIG. 3 | Constantly less than 0.31 vol % | Constantly less than 0.40 vol % | Constantly less than 0.45 vol % | 0.440 | 0.391 | 0.309 | 0.176 | 2.2 | Part of purified hydrogen gas feeding mechanism 2 | — | Less than 0.01 | 170 |
| Example 5 | Electrolyzer 3 | FIG. 4 | Constantly less than 0.35 vol % | Constantly less than 0.46 vol % | Constantly less than 0.55 vol % | 0.542 | 0.451 | 0.342 | 0.182 | 2.5 | Part of purified hydrogen gas feeding mechanism 3 | — | Less than 0.01 | 210 |
| Comp. Example 1 | Electrolyzer 3 | FIG. 4 | More than 0.85 volume % | More than 2.0 volume % | More than 4.6 volume % | 4.694 | 2.177 | 0.867 | 0.252 | 8.7 | — | — | 0.06 | 285 |

In Examples 1 to 5, the concentration of oxygen in hydrogen during the operations under a current density of 0.5 kA/m² or greater was constantly less than 0.5 volume %, and further Ob/Oa was less than 10. Further, the concentration of oxygen in hydrogen during the operations under a current density of 0.2 kA/m² was constantly less than 0.5 volume %, and further Ob/Oa was less than 10.

Particularly in Example 1, the concentration of oxygen Ob in the hydrogen during the operation under a current density of 0.2 kA/m² or greater was constantly less than 0.1 volume %, and was less than 0.2 volume % even during the operation under a current density of 0.1 kA/m². The concentration of oxygen in hydrogen at the outlet of the purifier was less than 0.01 volume %, and the temperature of the hydrogen gas at the outlet of the purifier was also kept low.

In contrast, in Comparative Example 1, the concentration of oxygen in hydrogen during the operation under a current density of 0.2 kA/m² or greater exceeded 2.0 volume %, and the concentration of oxygen in hydrogen at the outlet of the purifier reached as high as 0.06 volume %. The temperature of the hydrogen gas at the outlet of the purifier rose to 285° C., presenting a concern about a local increase in the catalyst temperature in the purifier.

INDUSTRIAL APPLICABILITY

According to the present disclosure, in water electrolysis employing a stable power supply or a variable power supply, the concentration of oxygen in a hydrogen gas to be fed to the purifier can be controlled in a stable manner, and reduction in the purification efficiency, reduction in the measurement accuracies and failures of meters can be efficiently prevented.

REFERENCE SIGNS LIST

50 Bipolar electrolyzer
70 Alkaline water electrolysis system
71 Tubing pump
72h Hydrogen separation tank
72o Oxygen separation tank
73 Water replenisher
74 Rectifier
75 Purifier
76 Meters
77h Hydrogen storage tank
77o Oxygen storage tank
79 Oxygen-in-hydrogen-gas density meter (O₂I)
80 Oxygen-in-hydrogen-gas density meter (O₂I)
81h Hydrogen feed tank
82 Flow meter
83 Hydrogen feed pump
91 Flow rate control valve
92 Bypass line
93 Non-return valve
100h Hydrogen gas line
100o Oxygen gas line
PI Pressure gauge
TI Thermometer

The invention claimed is:

1. A method of producing hydrogen using a water electrolysis system comprising at least an electrolyzer and a purifier for removing oxygen in a hydrogen gas generated in the electrolyzer, the method comprising:
controlling a concentration of oxygen in a hydrogen gas to be introduced to the purifier to be constantly less than 0.5 volume % in an operation of the electrolyzer under a low electric density region with a current density of 0.5 kA / m² or more and 2.0 kA / m² or less; and
further controlling Ob/Oa to be less than 10.0, where Oa represents the concentration of oxygen in the hydrogen gas to be introduced to the purifier when the electrolyzer is operated under a current density of 2.0 kA/m², and Ob represents the concentration of oxygen in the hydrogen gas to be introduced to the purifier when the electrolyzer is operated under a current concentration of 0.2 kA/m²,
wherein a cathode compartment and an anode compartment are separated by a single membrane, and hydrogen and oxygen are directly diffused and moved in the membrane in the electrolyzer.

2. The method of producing hydrogen according to claim 1, wherein the concentration of oxygen in the hydrogen gas to be introduced to the purifier is controlled to be constantly less than 0.5 volume % in the operation of the electrolyzer under a low electric density region with a current density of 0.2 kA/m² or more and 0.5 kA /m² or less.

3. The method of producing hydrogen according to claim 1, wherein the concentration of oxygen in the hydrogen gas to be introduced to the purifier is controlled to be constantly less than 0.2 volume % when the electrolyzer is operated under a current density of 0.2 kA/m² or greater and 0.5 kA/m² or less.

4. The method of producing hydrogen according to claim 1, wherein the concentration of oxygen in the hydrogen gas to be introduced to the purifier is controlled to be constantly less than 0.5 volume % even when the electrolyzer is operated under a current density of 0.1 kA/m² or greater and 0.5 kA/m² or less.

5. The method of producing hydrogen according to claim 1, wherein the water electrolysis system has a mechanism for controlling the concentration of oxygen in the hydrogen gas to be fed to the purifier.

6. The method of producing hydrogen according to claim 5, wherein the mechanism for controlling the concentration of oxygen in the hydrogen gas to be fed to the purifier is a mechanism for controlling a circulation flow rate of an electrolytic solution to the electrolyzer.

7. The method of producing hydrogen according to claim 6, wherein the mechanism for controlling the circulation flow rate of the electrolytic solution to the electrolyzer comprises at least one of an inverter disposed to a tubing pump for circulating the electrolytic solution and an automatic control valve disposed to a liquid distribution pipe for distributing the electrolytic solution.

8. The method of producing hydrogen according to claim 5, wherein the mechanism for controlling the concentration of oxygen in the hydrogen gas to be fed to the purifier is a mechanism for feeding a part of the hydrogen gas purified by the purifier.

9. The method of producing hydrogen according to claim 5, wherein the mechanism for controlling the concentration of oxygen in the hydrogen gas to be fed to the purifier is a mechanism for controlling the concentration of oxygen according to the current density in the electrolyzer.

10. The method of producing hydrogen according to claim 5, wherein the mechanism for controlling the concentration of oxygen in the hydrogen gas to be fed to the purifier is a mechanism for controlling the concentration of oxygen according to the concentration of oxygen in the hydrogen gas to be fed to the purifier.

11. The method of producing hydrogen according to claim 1, wherein the electrolyzer is used under an alkaline condition.

12. The method of producing hydrogen according to claim 1, wherein the electrolyzer comprises electrode compartments and a flow path for distributing the electrolytic solution to the electrode compartments, the flow path being partially formed from an insulating material.

* * * * *